US011811648B2

(12) United States Patent
Zhao et al.

(10) Patent No.: US 11,811,648 B2
(45) Date of Patent: Nov. 7, 2023

(54) DISTRIBUTED SUB-CONTROLLER PERMISSION FOR CONTROL OF DATA-TRAFFIC FLOW WITHIN SOFTWARE-DEFINED NETWORKING (SDN) MESH NETWORK

(71) Applicant: Cisco Technology, Inc., San Jose, CA (US)

(72) Inventors: Li Zhao, Shanghai (CN); Chuanwei Li, Shanghai (CN); Lele Zhang, Shanghai (CN); Haibo Dong, Shanghai (CN); Akram Ismail Sheriff, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/903,615

(22) Filed: Sep. 6, 2022

(65) Prior Publication Data

US 2022/0417135 A1 Dec. 29, 2022

Related U.S. Application Data

(63) Continuation of application No. 16/890,241, filed on Jun. 2, 2020, now Pat. No. 11,489,762.

(51) Int. Cl.
*H04L 45/24* (2022.01)
*H04L 45/02* (2022.01)
(Continued)

(52) U.S. Cl.
CPC ............ *H04L 45/24* (2013.01); *H04L 45/02* (2013.01); *H04L 47/122* (2013.01); *H04W 28/10* (2013.01); *H04W 84/18* (2013.01)

(58) Field of Classification Search
CPC ....... H04L 45/24; H04L 45/02; H04L 47/122; H04W 28/10; H04W 84/18
See application file for complete search history.

(56) References Cited

U.S. PATENT DOCUMENTS

2016/0218917 A1   7/2016  Zhang et al.
2017/0085462 A1*  3/2017  Zhou ..................... H04L 41/044
(Continued)

OTHER PUBLICATIONS

Office Action for U.S. Appl. No. 16/890,241, dated Dec. 24, 2021, Zhao, "Distributed Sub-Controller Permission for Control of Data-Traffic Flow Within Software-Defined Networking (SDN) Mesh Network", 11 pages.

(Continued)

*Primary Examiner* — Donald L Mills
(74) *Attorney, Agent, or Firm* — Lee & Hayes, P.C.

(57) ABSTRACT

Techniques for distributed sub-controller permission for control of data-traffic flow within software-defined networking (SDN) mesh networks to limit control plane traffic of the network are described herein. A technique described herein includes a network node of a data-traffic path of an SDN mesh network obtaining SDN sub-controller permission from a border controller of the SDN mesh network. Further, the technique includes suppression of data traffic from sibling and children nodes of data-traffic path allied nodes to the data-traffic path allied nodes. The data-traffic path allied nodes include network nodes that are part of the data-traffic path of the SDN mesh network. Further still, the technique includes the transmission of data across the data-traffic path.

20 Claims, 4 Drawing Sheets

(51) Int. Cl.
  *H04L 47/122* (2022.01)
  *H04W 28/10* (2009.01)
  *H04W 84/18* (2009.01)

(56) References Cited

U.S. PATENT DOCUMENTS

| | | | |
|---|---|---|---|
| 2017/0118066 A1* | 4/2017 | Mathew | H04L 41/0668 |
| 2017/0149614 A1 | 5/2017 | Zheng et al. | |
| 2018/0248755 A1* | 8/2018 | Hecker | H04L 41/0816 |
| 2018/0316601 A1 | 11/2018 | Sackman et al. | |
| 2019/0097890 A1 | 3/2019 | Zhang et al. | |
| 2019/0104061 A1 | 4/2019 | Zhang et al. | |
| 2019/0104207 A1* | 4/2019 | Goel | H04L 45/16 |
| 2019/0288939 A1 | 9/2019 | Dong | |
| 2019/0334909 A1* | 10/2019 | Schmitt | G06F 3/0659 |
| 2020/0336379 A1 | 10/2020 | Zhang et al. | |
| 2021/0377157 A1 | 12/2021 | Zhao et al. | |

OTHER PUBLICATIONS

Office Action for U.S. Appl. No. 16/890,241, dated May 6, 2022, Zhao, "Distributed Sub-Controller Permission for Control of Data-Traffic Flow Within Software-Defined Networking (SDN) Mesh Network", 14 pages.

* cited by examiner

DISTRIBUTED SUB-CONTROLLER PERMISSION FOR CONTROL OF DATA-TRAFFIC FLOW WITHIN SOFTWARE-DEFINED NETWORKING (SDN) MESH NETWORK

RELATED APPLICATIONS

This application claims priority to and is a continuation of U.S. patent application Ser. No. 16/890,241, filed on Jun. 2, 2020, the entire contents of which are incorporated herein by reference.

TECHNICAL FIELD

The present disclosure generally relates to distributed sub-controller permission for control of data-traffic flow within software-defined networking (SDN) mesh networks.

BACKGROUND

Many communication networks can be inflexible and difficult to maintain. Today, this is particularly true because many networks are dynamically adding many new devices and interconnections with new networks and disconnecting old devices and interconnections. To address these dynamic networks, the so-called Software-Defined Networking (SDN) paradigm has emerged. SDN adds a centralized higher-level of abstraction to provide greater manageability and flexibility than previously realized.

A mesh network (MN) is a distributed communications network topology of wired and/or wireless nodes (i.e., bridges, switches, routers, etc.) that connect directly, dynamically, and non-hierarchically to many other nodes and cooperate to efficiently route data across the network. Because of a lack of dependency on any one node, every node can participate in the relay of data. Mesh networks dynamically self-organize and self-configure. The ability to self-configure enables the dynamic distribution of workloads, particularly in the event a few nodes should fail. This, in turn, contributes to fault-tolerance and reduced maintenance costs.

Low-power and lossy network (LLN) is a category of networks characterized by frequent data loss, significant variability of delivery rate, short-term unreliability, and a degree of medium-term stability. LLN typically includes nodes with limited resources or capabilities, such as power, memory, and/or processing resources. LLNs are typically optimized for energy efficiency and exhibit low data rates. LLNs are frequently used for industrial monitoring, building automation, connected homes, healthcare, environmental monitoring, urban sensor networks, asset tracking, and the like.

BRIEF DESCRIPTION OF THE DRAWINGS

FIG. 1 illustrates an example network topology of hierarchical software-defined networking (SDN) mesh network, in accordance with the techniques described herein.

Figure 1:
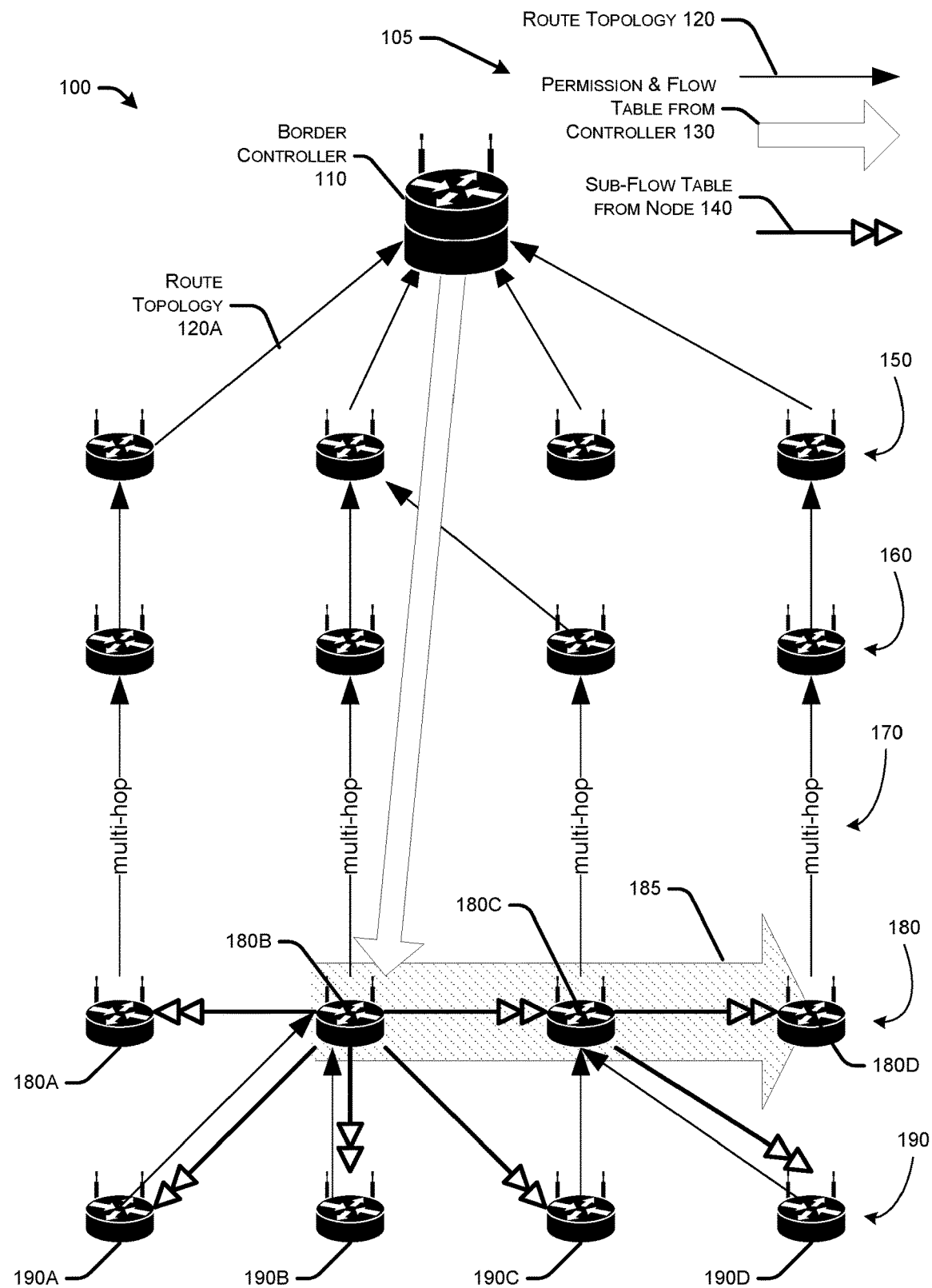
FIG. 1 illustrates

This detailed description of the drawings provides references to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for distributed sub-controller permission for control of data-traffic flow within software-defined networking (SDN) mesh networks to limit control plane traffic of the network. A method to perform the techniques described herein includes a network node of a data-traffic path of a software-defined networking (SDN) mesh network obtaining SDN sub-controller permission and from a border controller of the SDN mesh network. Further, the method includes suppression of data traffic from sibling and children nodes of data-traffic path allied nodes to the data-traffic path allied nodes. The data-traffic path allied nodes include multiple network nodes that are part of the data-traffic path of the SDN mesh network. Further still, the method includes the transmission of data across the data-traffic path.

Another method to perform the techniques described herein includes a border controller of a software-defined networking (SDN) mesh network that receives a request for data-traffic flow from a network node of the SDN mesh network. Further, the method includes a calculation of the data-traffic path based on requested data-traffic flow. The data-traffic path includes multiple allied nodes along which the data-traffic will traverse and updating the flow table based on the calculated data-traffic path. The method further includes a determination that the requested data-traffic flow meets or exceeds criteria for SDN sub-controller activation, and, in response to that determination, sending SDN sub-controller permission and updated flow table to one of the multiple allied nodes.

Additionally, the techniques described herein may be performed by a system and/or device having non-transitory computer-readable media storing computer-executable instructions that, when executed by one or more processors, performs the method described above.

Example Embodiments

This disclosure describes techniques for distributed sub-controller permission for control of data-traffic flow within software-defined networking (SDN) mesh network for the purpose of limiting control plane traffic of the network. SDN mesh networks combine the advantages of mesh networks and SDN control. With SDN, the data plane is separated from the control plane. That is, the data-traffic flow is managed separately from the control traffic flow. Thus, with SDN, the data-forwarding nodes are isolated from their decision-making capability and centralized in control unit called SDN controller.

Unfortunately, this approach is flawed in scenarios with unreliable and unstable traffic flow between nodes, a large distributed network of nodes, and/or low bandwidth. In these scenarios, a large portion of the overall traffic flow across the network is dedicated to the control plane. There may be many adjustments to the traffic flow caused by instability of nodes or of links between nodes. Because the traditional SDN controller is centralized, notifications of such instabilities must flow up through the network to the SDN controller and traffic flow adjustments must flow back down through the network to the nodes carrying the data traffic.

So-called low power and lossy networks (LLN) are good examples of these scenarios. LLNs are a class of network in which their nodes and/or their interconnects are constrained. LLN nodes typically operate with constraints on processing power, memory, and/or energy (e.g., battery power). Their interconnects are characterized by high loss rates, low data rates, and instability. A wireless LLN employs RPL (Routing Protocol for Low-Power and Lossy Networks) as its routing protocol for wireless networks with low power consumption and generally susceptible to packet loss. This protocol is specified by RFC 6550. Particular implementations of RPL may be called IPv6 over Low-Power Wireless Personal Area Network (6LoWPAN) protocol.

According to the techniques described herein, an SDN border controller of an SDN mesh network may receive a request for data-traffic flow from a network node of the SDN mesh network. In some instances, the SDN mesh network may be a low-power and lossy network and/or employ Routing Protocol for Low-Power and Lossy Networks (RPL). The SDN border controller may calculate a data-traffic path based on requested data-traffic flow. The data-traffic path includes multiple allied nodes along which the requested data-traffic flow will traverse. The requesting network node being one of the multiple allied nodes. In some instances, the data-traffic path may include multiple conditional data-traffic paths (i.e., multi-paths). That is, there may be multiple optional paths from which the active data-traffic path is selected based on conditional factors.

The SDN border controller may update a flow table based on requested data-traffic flow and the calculated data-traffic path. Herein, unless context indicates otherwise, a flow table is a data-forwarding table generated by an SDN controller. That is, a flow table defines the path of nodes along which data packets will be forwarded for each discrete block of data traffic.

In response to the determination, the SDN border controller may send SDN sub-controller permission and the updated flow table to one of the allied network nodes. With this SDN sub-controller permission, the network node has limited controller permission to manage data-traffic flow with the sibling and children nodes of the multiple allied nodes along which the requested data-traffic flow will traverse.

According to the techniques described herein, a network node of a data-traffic path of the SDN mesh network may obtain SDN sub-controller permission and updated flow table for the data-traffic path from a border controller of the SDN mesh network. The network node may generate sub-flow tables based on the obtained update flow table and may share the generated sub-flow tables with data-traffic path allied nodes, wherein data-traffic path allied nodes includes network nodes that are part of the data-traffic path of the SDN mesh network.

Further, the network node may suppress data traffic from sibling and children nodes of the data-traffic path allied nodes to the data-traffic path allied nodes. In some instances, the suppression may include the sending of the sub-flow tables to the sibling and children nodes of the data-traffic path allied nodes. The network node may transmit data across the data-traffic path.

Generally, the techniques described herein improve communication across SDN mesh networks with nodes and/or interconnects that may be characterized by high loss rates, low data rates, unreliability, and/or instability. Such networks are called SDN LLN mesh networks herein. Generally, the techniques described herein improve communications across such networks by, at least, limiting traffic in the control plane by, for example, pushing limited SDN controller permission to a network node lower in the hierarchy of the network from the SDN border controller.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example network topology of a hierarchical software-defined networking (SDN) mesh network 100 in accordance with the techniques described herein. The mesh network 100 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)— both centralized and/or distributed—and/or any combination, permutation, and/or aggregation thereof.

It should be appreciated that the configuration and network topology described herein has been greatly simplified and that many more computing systems, software components, networks, and networking devices can be utilized to interconnect the various computing systems disclosed herein and to provide the functionality described above.

The mesh network 100 has multiple nodes and/or interconnects therebetween that may be characterized by high loss rates, low data rates, unreliability, and/or instability. The border controller 110 sits at the top of the mesh network 100. The mesh network 100 is a low-power and lossy network (LLN) and/or employs Routing Protocol for Low-Power and Lossy Networks (RPL).

The border controller 110 acts as a border router for the network 100. As such, the border controller 110 acts as the bridge between the network and any external networks. The border controller 110 is an SDN controller, which is the logical centralized entity for the SDN network for managing the data paths across the network 100 and providing an abstract view of the network for management thereof.

The remainder of this FIG. 1 consists of network nodes and arrows. The network nodes are represented as a puck-like shape with four arrows on top and two antennas. The antennas indicate that the nodes may be wireless, but in some instances the nodes may be wired. Generally, a network node is a connection point that can receive, create, store, and/or transmit data to other nodes on the network. For example, a network node may include any type of networking device, such as servers, switches, routers, hubs, bridges, gateways, modems, repeaters, access points, etc. Additionally, the network nodes may include personal, user devices such as phones, tablets, wearables devices, or other personal computing devices. The network nodes may comprise physical nodes (e.g., processors, chipsets, devices, etc.), virtual nodes (virtual machines, containers, etc.), and/or any combination thereof. In some examples, the network nodes may be included in one or more physical locations.

A legend 105 for the different arrows used is found in the upper right corner of FIG. 1. The legend 105 includes a route topology arrow 120, an arrow 130 indicating the permission and flow table from the border controller, and an arrow 140 indicating the sub-flow table from a network node.

The route topology arrows 120 are indicated by an arrow with a thin solid shaft and a solid isosceles triangular arrowhead. As depicted, the route topology arrow 120 indicates the hierarchy of the route topology of the network 100. As such, the route topology arrow 120 indicates the parent-child relationship between the nodes. The arrow points from the child node to its parent node. The parent nodes sends/receives communications to/from its children and to/from its children's children, and so forth. The border controller 110 is the ultimate parent node for all of the nodes of the network.

As depicted, the nodes at layer 190 are the lowest level of the hierarchy illustrated. They have no children. As shown, layer 190 includes sibling nodes 190A, 190B, 190C, and 190D. The nodes of layer 180 are the parents to the nodes of layer 190. As shown, layer 180 includes sibling nodes 180A, 180B, 180C, and 180D. Layer 170 represents multiple "hops" or parent-child layers. It may be 10s, 100s, or even 1000s of hops represented here. The nodes of layer 160 represent the parents of the top layer of the multi-hop layer 170. The nodes of layer 150 represent the nodes that are parents to all of the other layers except the border controller 110 itself. None of the nodes of layers 150 and 160 are labeled with reference numbers. Of course, the border controller 110 is the ultimate top layer. The exact route topology shown in FIG. 1 is merely an illustrative one. No limitations are implied by this illustration. In other instances, each layer represents a rank.

The arrow 130 of the permission and flow table from the border controller is illustrated by a thick arrow drawn in outline form. As depicted, the arrow 130 points from the border controller 110 to a particular network node. In this illustration, that particular node is node 180B. The arrow 130 does not represent an actual communication link. Rather, the arrow 130 indicates the flow of control information (e.g., permission and flow tables) through the network 100 from border controller 110 to node 180B. The details of this are discussed herein.

The arrows 140 of the sub-flow table from a network node are illustrated by a doubled-headed arrowhead of a thin-shafted arrow. As depicted, the arrows 140 indicate that nodes— that are not the border controller 110—are sending sub-flow tables to other nodes. The details of this are discussed herein.

Each branch of the mesh network 100 may be described as directed acyclic graph (DAG). The overall hierarchical topology of the mesh network 100 may be described being destination oriented DAGs (DODAG) with the border controller 110 being the DODAG root. Each DAG is rooted at a single destination at a single DODAG root with no outgoing edges thereafter.

FIG. 1 depicts an example scenario that demonstrates the techniques described herein. In this example scenario, data traffic is primed to flow from node 180B to node 180D. That is, the requested data-traffic flow. For this flow, node 180B is the ingress node and node 180D is the egress node.

Since the border controller 110 is the centralized SDN controller for this network 100, the border controller determines the appropriate data-traffic path 185 for the data traffic to take. That is, the border controller determines the one or more intermediate nodes for the data traffic to take between the ingress node and the egress node.

The border controller 110 makes this determination using typical factors that SDN controllers take into consideration for such determinations. Those factors include, for example, selecting intermediate nodes with available data-traffic bandwidth, minimizing transmission time, maximizing reliability and stability, and other such factors.

Thus, the border controller 110 of the mesh network receives a request for or a notification regarding data-traffic flow from node 180B of the mesh network. As depicted, the ingress node is sending the request or notification of the data-traffic flow. However, in other scenarios, the egress node may send the request or notification.

The border controller 110 calculates the data-traffic path 185 based on requested data-traffic flow. The data-traffic path includes multiple allied nodes along which the requested data-traffic flow will traverse. The requesting network node being one of the multiple allied nodes. The other allied nodes are intermediate, ingress, and/or egress nodes.

In some instances, the data-traffic path may include multiple conditional data-traffic paths (i.e., multi-paths). That is, there may be multiple optional paths from which the active data-traffic path is selected based on conditional factors. The border controller 110 may push multi-paths to node 180B, the SDN sub-controller. In so doing, node 180B may select one of the multi-paths based on conditions related to various communications factors. Examples of such factors include loss of connection with a node, loss of fidelity of the connection with a node, noise on a connection, and the like.

With this multi-path feature, node 180B may be using a selected data-traffic path that experiences a disconnect. In response, node 180B may switch to another of the available multi-paths without needing permission or communication from the border controller 110. Without this feature, in the face with such a disconnect, node 180B would need to wait for an updated flow table from the border controller 110.

The border controller 110 updates a flow table based on the calculated data-traffic path. The updated flow table provide the data forwarding plan based on the calculated data-traffic path.

The border controller 110 determines whether the requested data-traffic flow meets or exceeds criteria for SDN sub-controller activation. For example, an application of node 180B may require that data be sent to node 180D at least at a rate of 100 k bytes per second. In that example, the criteria is met when node 180B is unable to send data traffic to node 180D at least at that rate. That is, the border controller 110 determines whether the conditions are right for the border controller to deputize one of the allied nodes of the data-traffic path to act as a sub-controller for the sibling and children nodes of the allied nodes.

In response to the determination, the SDN border controller may send SDN sub-controller permission and the updated flow table to the one of the allied network nodes, which will act as a sub-controller. That may be the requesting network node. In so doing, the border controller 110 delegates its functions to the sub-controller on a limited basis. Such limits include temporal, hierarchical privilege, limited functions, and the like. For example, the sub-controller permission may expire after an allocated time period; the sub-controller permission may extend only to children and/or sibling nodes of the data-traffic allied nodes; and/or the sub-controller permission is limited to a narrow set of functions.

The SDN sub-controller permission is injected as part of a special DAO message. DAO (Destination Advertisement Object) is a control message that is used to propagate destination information from the border controller 110 to the nodes of the DODAG. In this instance, additional information is included in the DAO message to provides the SDN sub-controller permission to Node 180B and the limitations on that permissions. In, for example, the LINUX™ operating system, permission level is as same as User level. Border controller 110 has the highest level, thus, the border controller can remove/add/modify the rules generated by node 180B. For example, in node 180C node, when two rules are conflicted, node 180C should trust the rule pushed by the border controller.

As depicted, node 180B of the data-traffic path 185 of the mesh network 100 obtains SDN sub-controller permission and updated flow table for the data-traffic path 185 from a border controller of the SDN mesh network. With this SDN sub-controller permission, the sub-controller designated node has limited controller permission to manage data-traffic flow with the sibling and children nodes of the multiple allied nodes along which the requested data-traffic flow will traverse. As depicted, the multiple allied nodes are nodes 180B, 180C, and 180D. The nodes of layer 190 are the children nodes of the multiple allied nodes. The nodes of layer 180 are the siblings of the multiple allied nodes. As depicted, only node 180A is a child node that is not part of the multiple allied nodes.

As depicted, node 180B is the ingress node, node 180C is an intermediate node, and node 180D is the egress node of the data-traffic path 185. Thus, for this scenario, the ingress node is the SDN sub-controller. However, in other scenarios, the SDN sub-controller may be one of the intermediate nodes or the egress node.

Node 180D suppresses data traffic from sibling and children nodes of the data-traffic path allied nodes to the data-traffic path allied nodes. In some instances, the sub-controller may direct the data-traffic suppression and the other of the data-traffic path allied nodes may merely pass along the sub-controller's control information to the siblings and children nodes. In other instances, the allied nodes may act in a cooperative manner. That is, each allied node directing its immediate adjacent sibling and/or children nodes.

In some instances, the data-traffic suppression may be accomplished by the sub-controller generating sub-flow tables and sharing them with the sibling and children nodes of the data-traffic path allied nodes. A sub-flow table is a flow table generated by the SDN sub-controller for its data-traffic path allied nodes and/or the siblings and/or children of the allied nodes. The border controller 110 does not generate or send the sub-flow tables. Rather, the sub-controller (and perhaps its allied nodes) generate the sub-flow tables.

Some of these sub-flow tables are supplied to the data-traffic path allied nodes so as to direct them on how to forward the data traffic of the data-traffic path. As depicted, node 180B sends sub-flow tables to node 180C, and/or node 180D. In some instances, node 180C sends a sub-flow table to node 180D.

Some of the sub-flow tables include data forwarding instructions for the sibling and children nodes that detour data flow around and away from the data-traffic path allied nodes to the data-traffic path allied nodes. Thus, as depicted, node 180B sends a sub-flow table to sibling node 180A that directs node 180A to send data traffic around or away from node 180B, node 180C, and/or node 180D. Similarly, node 180B sends a sub-flow table to children nodes 190A, 190B, and 190C that directs those children nodes to send data traffic around or away from node 180B, node 180C, and/or node 180D.

As depicted, node 180C sends a sub-flow table to children node 190D that directs those children nodes to send data traffic around or away from node 180B, node 180C, and/or node 180D. Since there are no unsuppressed sibling or children nodes remaining, node 180D does not send any sub-flow table to any sibling or children nodes.

Once the local data-traffic has been suppressed, the allied network transmit data across the data-traffic path. As depicted, node 180B sends data packets along the data-traffic path 185 to node 180D via node 180C.

Depending upon the particulars of the implementation, the SDN sub-controller permission is limited based on one or more various factors. Such limitations include conditional, temporal, hierarchical privilege, limited functions, and the like. For example, the sub-controller permission may expire after the discrete data transmission associated with the permission is completed. In another example, the sub-controller permission may be exercised only on children and/or sibling nodes of the data-traffic allied nodes. With other example, the sub-controller permission is limited to a narrow set of functions.

In some instances, the sub-controller may determine whether the loss of data from particular children nodes of the data-traffic path allied nodes is unacceptable. That is, the sub-controller may determine which children nodes, if any, may have data that cannot be ignored. This may occur, for example, if the node is the only parent of this children, the loss of data from particular children nodes of the data-traffic path allied nodes is unacceptable.

In response to the determination that particular children have data traffic that cannot be ignored, the sub-controller suppresses the data traffic from just those particular children. And it merely ignores any incoming traffic from the other children. The suppression of the data traffic, in this instance, may include sharing sub-flow tables with those particular children that redirect data traffic away from the allied nodes. In some implementations, the determination and suppression may be done collectively or cooperatively by the allied nodes.

In some instances, a priority (i.e., rank) of the sub-flow tables pushed or shared by a node is lower than the flow tables pushed by the border controller 110. That is, if a node receives a flow table from the border controller 110 and a sub-flow table from a node (e.g., the SDN sub-controller or its allied node), the flow table from the border controller 110 is honored because it has priority. A projected DAO message with route priority may be extended to implement this feature.

In some instances, the SDN sub-controller or its allied nodes may broadcast a control message to other nodes to suppress data-traffic by redirecting other nodes' flow table away from the broadcast node. For example, node 180B sends a broadcast message to notify nodes 190A and 190B to not forward data traffic to node 180B. In some implementations, the broadcasted control message may be layer 2 broadcast control message, which is a data-link layer control message sent to all nodes on the network 100.

In some instances, nodes may be limited to sending unicast control messages to redirect nodes with lower priority. For example, presuming that node 190A has the same priority at node 180B, but node 190B has a lower priority than both nodes 190A and 180B, then node 180B is limited to suppressing data traffic from node 190B. Thus, node 180B does not attempt to control data-traffic from 190A since its priority is not lower than that of node 180B.

In a traditional SDN networking scenario, the SDN controller maintain all flow tables' state of the entire network 100. To reduce the control-plane traffic necessary to maintain this centralized maintenance, some instances of the SDN sub-controller may maintain some of the flow tables without seeking permission from the SDN controller first. That is, the SDN sub-controller may change flow tables of some nodes and then interact with the SDN controller. In these instances, the SDN sub-controller maintains the nodes of equal or lower priority.

In some instances, if a node has data traffic to send to a neighboring node via an alternative path, a comparison of 6LoWPAN header attributes may be performed to uniquely create a FlowID. Flow ID is a label for the identification of the particular rule or flow. This unique FlowID may be based on, for example, time of updates of protected DAO and DIO messages. DIO is DODAG information Object that carries information that allows a node to discover a RPL instance and learn its parameters. RPL instance is a set of one or more DODAGs that share the same identifier (e.g., RPLInstanceID).

Figure 2:
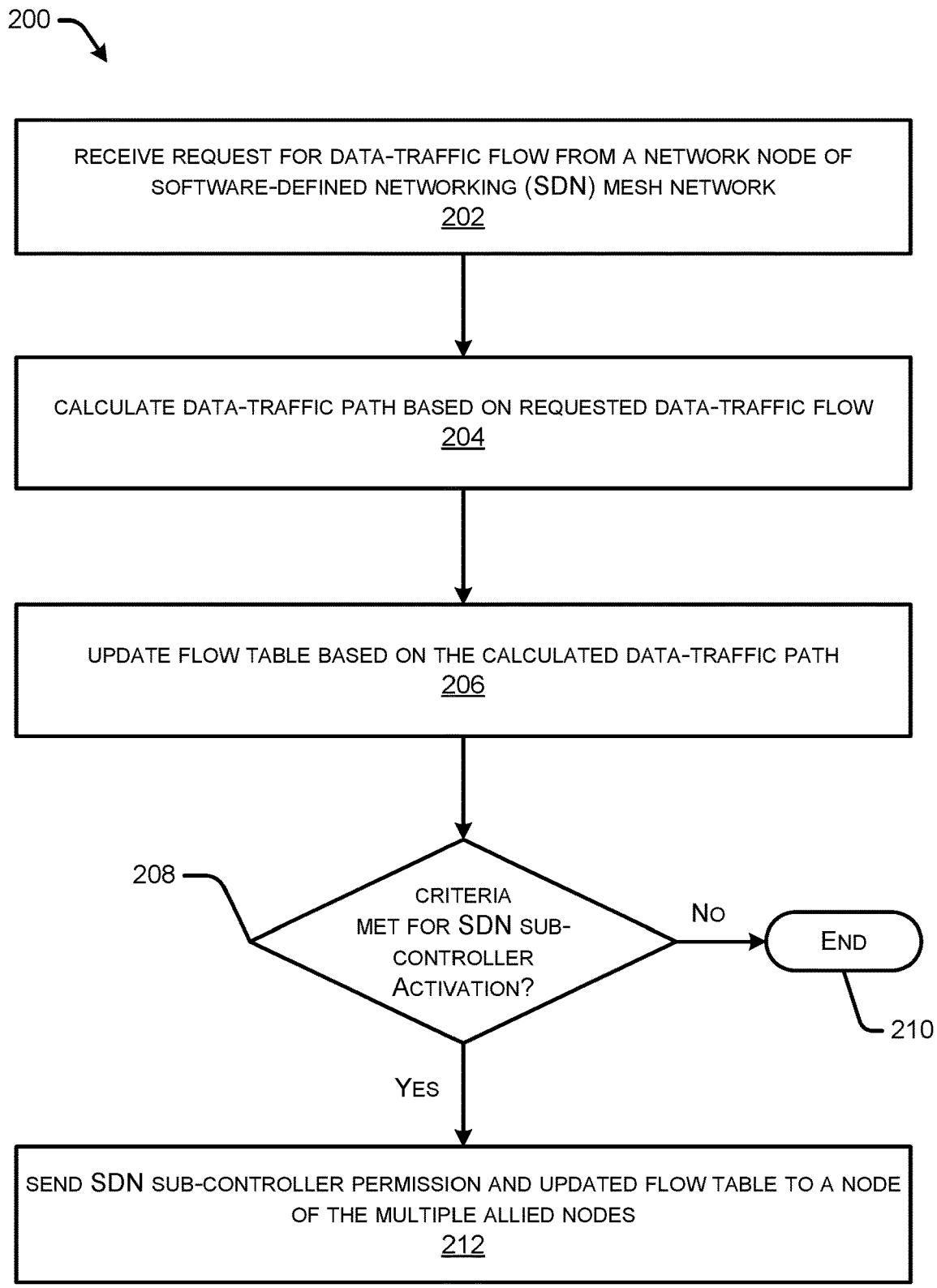
FIG. 2 illustrates a flow diagram of an example method for a software-defined networking (SDN) controller to distribute sub-controller permission for control of data-traffic flow within an SDN mesh network to limit control plane traffic of the network, in accordance with the techniques described herein.
Figure 3:
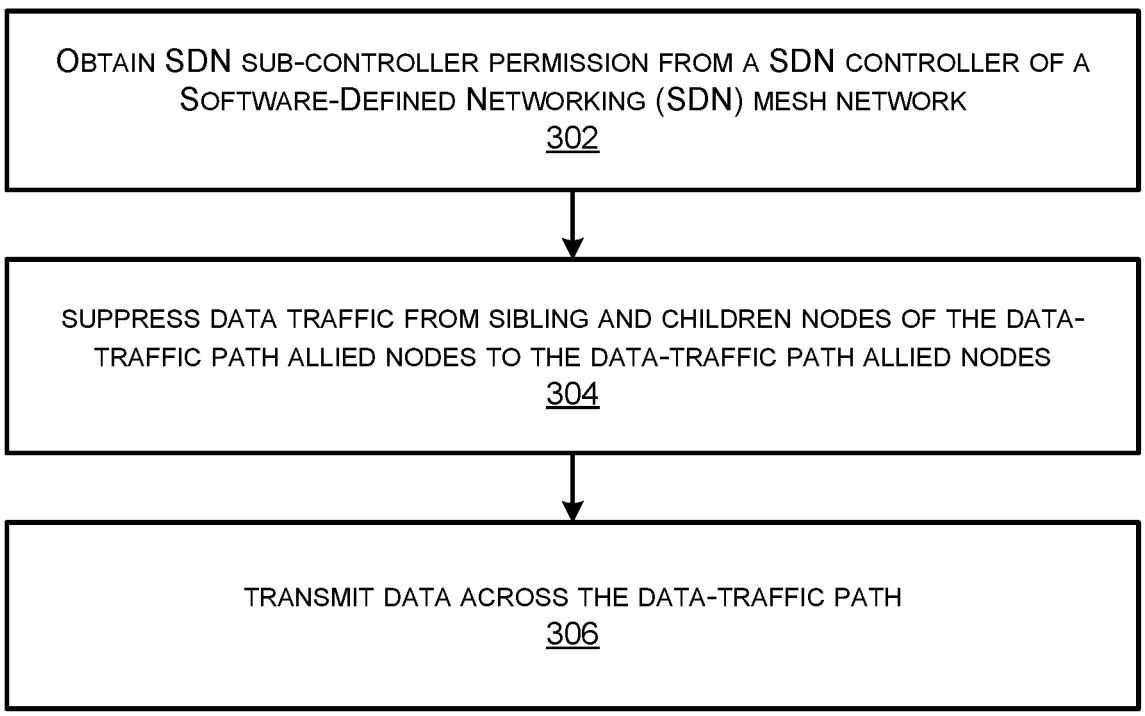
FIG. 3 illustrates a flow diagram of an example method for a network node in an SDN mesh network to obtain sub-controller permission for control of data-traffic flow within the network to limit control plane traffic of the network, in accordance with the techniques described herein.

FIGS. 2 and 3 illustrate flow diagrams of example methods 200 and 300 that illustrate aspects of the functions performed at least partly by an SDN controller and the SDN sub-controller of an SDN mesh network. The border controller 110 and node 180B as described in FIG. 1 are examples of such controllers in such a network. The logical operations described herein with respect to FIGS. 2 and 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2 and 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 2 illustrates a flow diagram of an example method 200 to distribute sub-controller permission for control of data-traffic flow within an SDN mesh networks for the purpose of limiting control plane traffic of the network. In some examples, the example method 200 may be performed by a system comprising one or more processors and one or more non-transitory computer-readable media storing computer-executable instructions that, when executed by the one or more processors, cause the one or more processors to perform the steps of the example method 200. In some instances, the system may include the border controller 110 described herein.

At 202, an SDN border controller of a software-defined networking (SDN) mesh network receives a request and/or notification for data-traffic flow from a network node of the SDN mesh network. With reference to FIG. 1, the border controller 110 of the mesh network 100 receives a request and/or notification for data-traffic flow from node 180B to node 180D.

At 204, the SDN border controller calculates a data-traffic path based on the requested data-traffic flow. With reference to FIG. 1, the border controller 110 calculates the data-traffic path 185, which includes nodes 180B, 180C, and 180D in that order. The data-traffic path includes multiple allied nodes along which the data-traffic will traverse. Thus, nodes 180B, 180C, and 180D are the multiple allied nodes of the data-traffic path 185.

For the method 200, the SDN mesh network is a low-power and lossy network and the SDN sub-controller permission is included in a DAO message sent by the SDN border controller.

At 206, the SDN border controller updates flow table based on the calculated data-traffic path. In some instances, the updated flow table includes multiple conditional data-traffic paths.

At 208, the SDN border controller determines whether the requested data-traffic flow meets or exceeds criteria for SDN sub-controller activation. Activation may only deemed appropriate when the reduction in control-traffic is significant. If not, then the method 200 ends at 210. In this situation, the SDN border controller operates as normal and without any distribution of sub-controller permission. If so, then the method 200 continues to operation 212.

At 212, in response to the determination that the requested data-traffic flow meets or exceeds criteria for SDN sub-controller activation, the SDN border controller sends SDN sub-controller permission and updated flow table to one of the multiple allied nodes. In some instances, the sub-controller permission is sent to the requesting node. In some instances, the sub-controller permission may be sent to one of the other allied nodes. Thus, the sub-controller permission may be granted to an ingress node, egress node, or one of the intermediate nodes of the data-traffic path.

FIG. 3 illustrates a flow diagram of an example method 300 for a network node in an SDN mesh network to obtain sub-controller permission for control of data-traffic flow within the network to limit control plane traffic of the network, in accordance with the techniques described herein. In some examples, the example method 300 may be performed by a system comprising one or more processors and one or more non-transitory computer-readable media storing computer-executable instructions that, when executed by the one or more processors, cause the one or more processors to perform the steps of the example method 300. In some instances, the system may include the border controller 110 described herein.

At 302, a network node of a data-traffic path obtains SDN sub-controller permission from an SDN controller of the SDN mesh network. With reference to FIG. 1, node 180B is part of the data-traffic path 185 and that node obtains SDN sub-controller permission from the border controller 110. The nodes 180B, 180C, and 180D comprise the allied nodes of the data-traffic path 185.

In addition, the network node may obtain an updated flow table for the data-traffic path from the SDN border controller. The network node that obtains SDN sub-controller permission may be an ingress, intermediate, or egress node of the data-traffic path of the SDN mesh network.

At 304, the permitted network node suppresses data traffic from sibling and children nodes of the data-traffic path allied nodes to the data-traffic path allied nodes. That is, the permitted network node (i.e., SDN sub-controller) initiates actions to suppress data traffic coming from nodes of equal or lower rank or priority than allied nodes of the data-traffic path.

The SDN permission does not allow the permitted network node to suppress data traffic from nodes of higher rank or priority than that of the allied nodes of the data-traffic path. While the permitted network node initiates the data-traffic suppression, the other allied nodes may participate and/or cooperate with such suppression.

The data-traffic suppression may include the generation of sub-flow tables based on the obtained updated flow table. The sub-flow tables direct data-traffic around and/or away from the allied nodes. The generated sub-flow tables may be shared with the allied nodes and may be sent to sibling and children nodes of the data-traffic path allied nodes.

In some instances, the data-traffic suppression may include a determination whether a loss of data from particular children nodes of the data-traffic path allied nodes is unacceptable. If a data loss is acceptable from particular children, then the data traffic from those particular nodes is not suppressed. Rather, any data from those particular children is ignored.

However, if response to a determination that loss of data from particular children nodes of the data-traffic path allied nodes is unacceptable, then the data traffic from those determined particular nodes is suppressed. This may be done by sending sub-flow tables to the determined particular children nodes.

At 306, the data is transmitted across the data-traffic path from the ingress node, through the intermediate nodes, and then to the egress node. While data is being transmitted, data from other sibling and children nodes to the allied nodes is suppressed. The SDN-controller permission may be limited or revoked. It may expire based on given conditions or triggers (e.g., time, completion of data transmission, higher priority data traffic, and the like).

Figure 4:
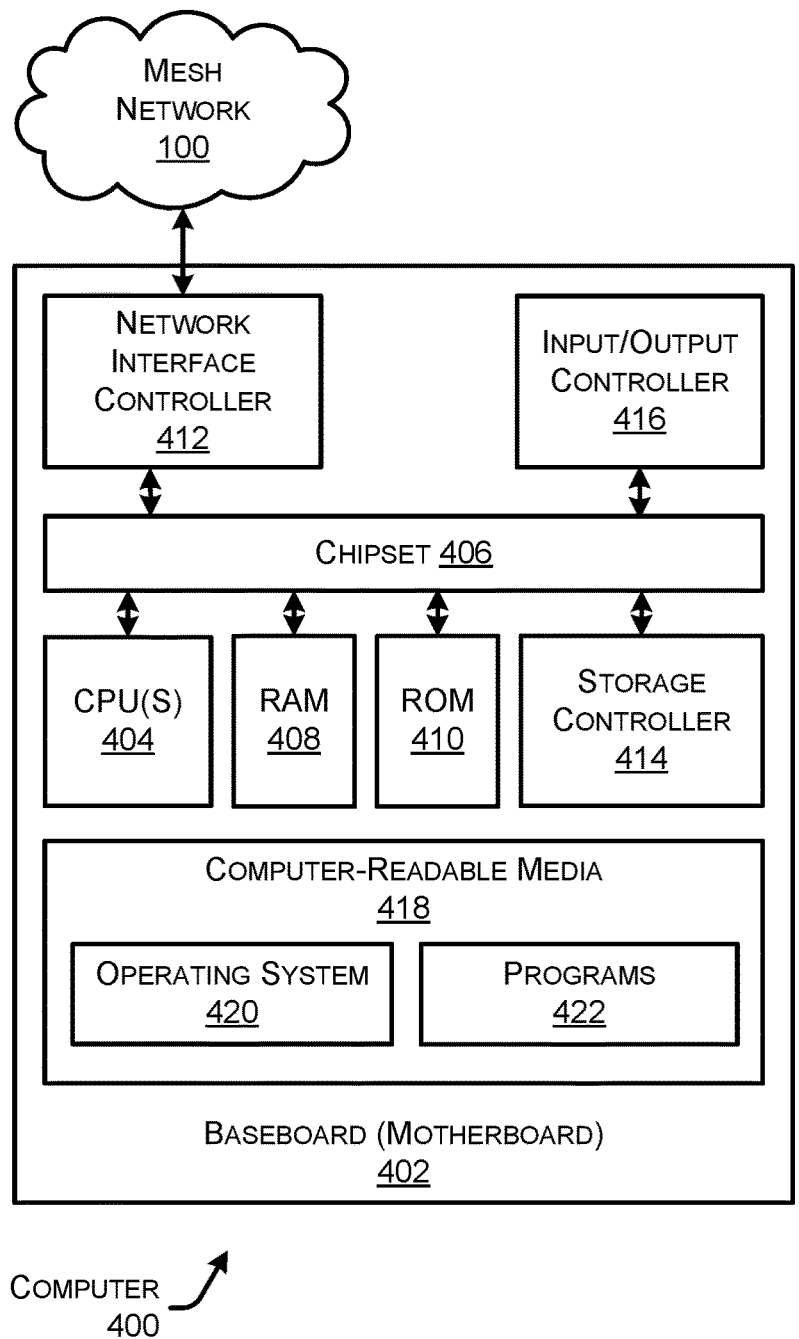
FIG. 4 is a computer architecture diagram showing an illustrative computer hardware architecture for implementing a network node that can be utilized to implement aspects of the various technologies presented herein.

FIG. 4 shows an example computer architecture for a network node 400 capable of executing program components for implementing the functionality described above. The computer architecture shown in FIG. 4 illustrates a conventional server computer, workstation, desktop computer, laptop, tablet, network appliance, e-reader, smartphone, or other computing device, and can be utilized to execute any of the functionalities presented herein. The network node 400 may, in some examples, correspond to one of many types of network devices, such as servers, switches, routers, hubs, bridges, gateways, modems, repeaters, access points, etc.

The network node 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the network node 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the network node 400. The chipset 406 can further provide an interface to a computer-readable storage medium such as a read-only memory ("ROM") 410 or non-volatile RAM ("NVRAM") for storing basic routines that help to startup the network node 400 and to transfer information between the various components and devices. The ROM 410 or NVRAM can also store other software components necessary for the operation of the network node 400 in accordance with the configurations described herein.

The network node 400 can operate in a networked environment using logical connections to remote computing devices and computer systems through a network, such as the mesh network 100. The chipset 406 can include functionality for providing network connectivity through a NIC 412, such as a gigabit Ethernet adapter. The NIC 412 is capable of connecting the network node 400 to other computing devices over the mesh network 100 (and/or 102). It should be appreciated that multiple NICs 412 can be present in the network node 400, connecting the computer to other types of networks and remote computer systems.

The network node 400 can be connected to a storage device 418 that provides non-volatile storage for the computer. The storage device 418 can store an operating system 420, programs 422, and data, which have been described in greater detail herein. The storage device 418 can be connected to the network node 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The network node 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the network node 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The network node 400 can further read information from the storage device 418 by detecting the physical states or characteristics of one or more particular locations within the physical storage units.

In addition to the mass storage device 418 described above, the network node 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the network node 400.

In some examples, the operations performed by the border controller 110 and/or the network nodes of the network 100, and or any components included therein, may be supported by one or more devices similar to network node 400. Stated otherwise, some or all of the operations performed in accordance with methods 200 and 300 may be performed by one or more network nodes 400 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the network node 400. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 418 can store other system or application programs and data utilized by the network node 400.

In one embodiment, the storage device 418 or other computer-readable storage media is encoded with computer-executable instructions which, when loaded into the network node 400, transform the computer from a general-purpose computing system into a special-purpose computer capable of implementing the embodiments described herein. These computer-executable instructions transform the network node 400 by specifying how the CPUs 404 transition between states, as described above. According to one embodiment, the network node 400 has access to computer-readable storage media storing computer-executable instructions which, when executed by the network node 400, perform the various processes described above with regard to FIGS. 1-3. The network node 400 can also include computer-readable storage media having instructions stored thereupon for performing any of the other computer-implemented operations described herein.

The network node 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the network node 400 might not include all of the components shown in FIG. 4, can include other components that are not explicitly shown in FIG. 4, or might utilize an architecture completely different than that shown in FIG. 4.

As described herein, the network node 400 may include one or more hardware processors 404 (processors) configured to execute one or more stored instructions. The processor(s) 404 may comprise one or more cores. Further, the network node 400 may include one or more network interfaces configured to provide communications between the network node 400 and other devices, such as the communications. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 422 may comprise any type of programs or processes to perform the techniques described in this disclosure performed by the border controller 110 and/or SND sub-controller. For instance, the programs 422 may cause the network node 400 to perform techniques for distributed sub-controller permission for control of data-traffic flow within SDN mesh networks for the purpose of limiting control plane traffic of the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
obtaining, by a first data-plane node of a data-traffic path of a software-defined networking (SDN) mesh network, SDN sub-controller permission from a controller of the SDN mesh network, the SDN sub-controller permission including permissions for the first data-plane node to switch among multipaths in flow tables for the SDN mesh network without communicating with the controller;
receiving, at the first data-plane node, a flow table from the controller of the SDN mesh network, the flow table indicating multipath routes to a second data-plane node including a first route from the first data-plane node to the second data-plane node and a second route from the first data-plane node to the second data-plane node;

communicating, by the first data-plane node, with the second data-plane node using the first route;

determining that the first route disconnected between the first and second data-plane nodes;

determining, using the sub-controller permission and without communicating with the controller to receive a new route, to switch from the first route and to the second route; and using the flow table stored at the first data-plane node, communicating, by the first data-plane node, with the second data-plane node using the second route.

2. The method of claim 1, wherein the first data-plane node determines to use the second route based at least in part on using the SDN sub-controller permission and independent of input from the controller.

3. The method of claim 1, wherein determining that the first route disconnected between the first and second data-plane nodes includes determining that loss of data communicated over the first route violates a threshold.

4. The method of claim 1, further comprising using the SDN sub-controller permission, sending, from the first data-plane node, the flow table to at least one of a neighbor node or a sibling node of the first data-plane node.

5. The method of claim 4, further comprising:
obtaining an updated flow table for the first route and the second route from the controller of the SDN mesh network;
generating updated sub-flow tables based on the updated flow table; and
sending the updated sub-flow tables to the at least one of the neighbor node or the sibling node.

6. The method of claim 1, wherein:
the SDN mesh network is a low-power and lossy network; and
the SDN mesh network employs IPv6 over Low-Power Wireless Personal Area Network (6LoWPAN) protocol.

7. The method of claim 1, wherein the SDN sub-controller permission is included in a destination advertisement object (DAO) message received from the controller of the SDN mesh network.

8. The method of claim 1, wherein the SDN sub-controller permission expires after a defined period of time.

9. A first data-plane node of a data-traffic path of a software-defined networking (SDN) mesh network, the first data-plane node comprising:
one or more processors; and
one or more non-transitory computer-readable media storing computer-executable instructions that, when executed by the one or more processors, cause the one or more processors to perform operations comprising:
obtaining SDN sub-controller permission from a controller of the SDN mesh network, the SDN sub-controller permission including permissions for the first data-plane node to switch among multipaths in flow tables for the SDN mesh network without communicating with the controller;
receiving, at the first data-plane node, a flow table from the controller of the SDN mesh network, the flow table indicating multipath routes to a second data-plane node including a first route from the first data-plane node to the second data-plane node and a second route from the first data-plane node to the second data-plane node;
communicating with the second data-plane node using the first route;

determining that communications sent over the first route experienced degradation that violates a degradation threshold;

determining, using the sub-controller permission and without communicating with the controller that to receive a new route, to switch from the first route and to the second route; and using the flow table stored at the first data-plane node, communicating, by the first data-plane node, with the second data-plane node using the second route.

10. The first data-plane node of claim 9, wherein the first data-plane node determines to use the second route based at least in part on using the SDN sub-controller permission and independent of input from the controller.

11. The first data-plane node of claim 9, wherein determining that the first route disconnected between the first and second data-plane nodes includes determining that loss of data communicated over the first route violates a threshold.

12. The first data-plane node of claim 9, the operations further comprising using the SDN sub-controller permission, sending, from the first data-plane node, the flow table to at least one of a neighbor node or a sibling node of the first data-plane node.

13. The first data-plane node of claim 12, the operations further comprising:
obtaining an updated flow table for the first route and the second route from the controller of the SDN mesh network;
generating updated sub-flow tables based on the updated flow table; and
sending the updated sub-flow tables to the at least one of the neighbor node or the sibling node.

14. The first data-plane node of claim 9, wherein:
the SDN mesh network is a low-power and lossy network; and
the SDN mesh network employs IPv6 over Low-Power Wireless Personal Area Network (6LoWPAN) protocol.

15. The first data-plane node of claim 9, wherein the SDN sub- controller permission is included in a destination advertisement object (DAO) message received from the controller of the SDN mesh network.

16. One or more non-transitory computer-readable media storing computer-executable instructions that, when executed by one or more processors, cause the one or more processors to perform operations comprising:
obtaining, at a first data-plane node of a data-traffic path of a software-defined networking (SDN) mesh network, SDN sub-controller permission from a controller of the SDN mesh network, the SDN sub-controller permission including permissions for the first data-plane node to switch among multipaths in flow tables for the SDN mesh network without communicating with the controller;
receiving, at the first data-plane node, a flow table from the controller of the SDN mesh network, the flow table indicating multipath routes to a second data-plane node including a first route from the first data-plane node to the second data-plane node and a second route from the first data-plane node to the second data-plane node;
communicating, by the first data-plane node, with the second data-plane node using the first route;
determining that the first route disconnected between the first and second data-plane nodes;
determining, using the sub-controller permission and without communicating with the controller to obtain a new route, to switch from the first route and to the second route; and using the flow table stored at the first data-plane node,
communicating, by the first data-plane node, with the second data-plane node using the second route.

17. The one or more non-transitory computer-readable media of claim 16, wherein the first data-plane node determines to use the second route based at least in part on using the SDN sub-controller permission and independent of input from the controller.

18. The one or more non-transitory computer-readable media of claim 16, wherein determining that the first route disconnected between the first and second data-plane nodes includes determining that loss of data communicated over the first route violates a threshold.

19. The one or more non-transitory computer-readable media of claim 16, the operations further comprising using the SDN sub-controller permission, sending, from the first data-plane node, the flow table to at least one of a neighbor node or a sibling node of the first data-plane node.

20. The one or more non-transitory computer-readable media of claim 19, the operations further comprising:
obtaining an updated flow table for the first route and the second route from the controller of the SDN mesh network;
generating updated sub-flow tables based on the updated flow table; and
sending the updated sub-flow tables to the at least one of the neighbor node or the sibling node.

* * * * *